United States Patent
Seale et al.

[15] 3,676,501
[45] July 11, 1972

[54] PRODUCTS OF REACTION OF POLYOXYALKYLENE ALCOHOLS AND DI-GLYCIDYL ETHERS OF BIS-PHENOL COMPOUNDS

[72] Inventors: Virgil L. Seale; Billy Ray Moreland; James Derwin De Shazo, all of Houston, Tex.

[73] Assignee: Nalco Chemical Company, Chicago, Ill.

[22] Filed: March 23, 1970

[21] Appl. No.: 20,452

Related U.S. Application Data

[60] Continuation of Ser. Nos. 707,931, Feb. 26, 1968, abandoned, and Ser. No. , , which is a division of Ser. No. 523,971, Feb. 1, 1966, Pat. No. 3,383,325, which is a continuation-in-part of Ser. No. 350,112, March 6, 1964, Pat. No. 3,383,326.

[52] U.S. Cl. ........................260/613 B, 260/348 R, 252/358
[51] Int. Cl. ............................................................C07c 43/22
[58] Field of Search................................................260/613 B

[56] References Cited

UNITED STATES PATENTS

| | | |
|---|---|---|
| 2,499,366 | 3/1950 | De Groote et al..................260/613 B |
| 2,499,367 | 3/1950 | De Groote et al..................260/613 B |
| 2,499,370 | 3/1950 | De Groote et al..................260/613 B |
| 2,594,541 | 4/1952 | De Groote et al..................260/613 B |
| 2,723,241 | 11/1955 | De Groote et al..................260/613 B |
| 3,078,271 | 2/1963 | De Groote et al..................260/613 B |

*Primary Examiner*—Bernard Helfin
*Attorney*—Johnston, Root, O'Keeffe, Keil, Thompson & Shurtleff

[57] ABSTRACT

Compositions of matter, and breaking water-in-oil petroleum emulsions therewith, which compositions comprise a substantially water-insoluble, at least partially oil-soluble product formed by the reaction of (A) a polyoxyalkylene alcohol in which the oxyalkylene groups consist essentially of a member from the group consisting of oxypropylene, oxybutylene, and both oxypropylene and oxybutylene, with at least one terminal 2-hydroxyethyl group and (B) a diglycidyl ether of a bis-phenol compound in which about 60 to 90 percent of said diglycidyl ether groups are reacted with the hydroxyl groups of said polyoxyalkylene glycol with the formation of ether linkages between the polyoxyalkylene glycol nuclei and the bis-phenol compound nuclei, the remaining, unreacted glycidyl ether groups of the resultant product being reacted with hydroxyl groups on (C) polyoxyalkylene groups of a polyoxyalkylated alkyl phenol-formaldehyde polycondensate with the formation of ether linkages between said reaction product of (A) and (B) and said polyoxyalkylated polycondensate, the alkyl groups of the phenol of (C) having an average of four to 15 carbons, said polycondensate having an average of about four to 15 phenolic nuclei per molecule, the oxyalkylene groups of (C) being selected from the group consisting of oxyethylene, oxypropylene, and both oxyethylene and oxypropylene, and the weight ratio of said last-mentioned oxyalkylene groups to said alkyl phenol-formaldehyde polycondensate being in the range of about 1:5 to 15:1, respectively, said diglycidyl ether being a member selected from the group consisting of diphenyldiglycidyl ether and a diglycidyl ether of diphenylmethane, with the remaining substituents on the methane carbon being selected from the group consisting of hydrogen and methyl.

5 Claims, No Drawings

PRODUCTS OF REACTION OF POLYOXYALKYLENE ALCOHOLS AND DI-GLYCIDYL ETHERS OF BIS-PHENOL COMPOUNDS

RELATED APPLICATIONS

This application is a continuation of application Ser. No. 707,931, filed Feb. 26, 1968, which is now abandoned and which is a division of our copending application Ser. No. 523,971, filed Feb. 1, 1966, now U.S. Pat. No. 3,383,325, issued May 14, 1968 which in turn is a continuation-in-part of our copending application Ser. No. 350,112, filed Mar. 6, 1964 now U.S. Pat. No. 3,383,326, issued May 14, 1968.

BACKGROUND OF THE INVENTION

Petroleum emulsions are commonly encountered in the production, handling and refining of crude mineral oil. Petroleum emulsions are, in general, of the water-in-oil type wherein oil acts as the continuous phase for dispersal of the finely divided particles of naturally occurring waters or brines. These emulsions are often extremely stable and will not resolve into the oil and water components even on long standing. The emulsions obtained from producing wells and from the bottom of crude oil storage tanks are commonly referred to as "cut oil," "emulsified oil," "bottom settlings" and "B.S." It is also to be understood that water-in-oil emulsions may occur artificially, resulting from any one or more of numerous operations encountered in various industries.

One type of process involves subjecting emulsions of the water-in-oil type to the action of a demulsifying agent of the kind hereinafter described, thereby causing the emulsion to resolve and stratify into its component parts of oil and water or brine after the emulsion has been allowed to stand in a relatively quiescent state.

One object of the present invention is to provide novel, economical and effective compositions for resolving emulsions of the character referred to into their component parts of oil and water or brine.

Another object is to provide demulsifying compositions exhibiting improved, emulsion-breaking efficacy and improved water-coalescing power in comparison to the compositions described and claimed in the aforesaid pending applications.

Still another object is to provide very effective compositions for resolving petroleum emulsions into their component parts of oil and water. Other objects, advantages and features of the invention are described hereinafter.

INVENTION OF COPENDING APPLICATION

In our pending application Ser. No. 350,112, the crude oil demulsifying agents are the essentially water insoluble, at least partially oil soluble product of the reaction of an epoxide of a polyphenol, preferably a diglycidyl ether of bis-phenol A, and an adduct obtained by reacting ethylene oxide with a higher alkylene oxide adduct of a hydroxy hydrocarbyl compound or a hydroxy hydrocarbyl ether containing up to twelve carbon atoms and one to three hydroxyl groups wherein the oxyalkylene groups are oxypropylene (preferably 1,2-oxypropylene), oxybutylene (preferably 1,2-oxybutylene) or mixtures of oxypropylene and oxybutylene.

In making these compositions, a first adduct is made by adding an alkylene oxide, such as, for example, 1,2-butylene oxide, or 1,2-propylene oxide, or mixtures thereof, to a suitable monohydric, dihydric or trihydric compound, such as, for example, normal butyl alcohol, secondary butyl alcohol, normal propanol, isopropanol, butanol-1, the butyl ether of diethylene glycol, phenol, ortho-, meta-, or para-isopropyl phenol, ortho-, meta-, or parabutyl phenol, ortho, meta-, or para-amyl phenol, propylene glycol, 1,2-propylene glycol, 1,3-butylene glycol, 1,2,6-hexamethylenetriol, or glycerine. Thereafter ethylene oxide is added to the first adduct to form a second adduct which is an oxyethylated adduct in which the proportion of primary hydroxyl groups to secondary hydroxyl groups is such as to give the desired product when reacted with an epoxide of a polyphenol.

The reaction between the oxyethylated adduct and the epoxide of the polyphenol is carried out in the presence of a solvent in which the oxyethylated adduct, the epoxide of the polyphenol, and copolymers of oxyethylated adduct and the epoxide of the polyphenol are soluble. The quantity of the solvent should be such that the rate of reaction of oxyethylated adduct with the epoxide of the polyphenol and the self polymerization of the epoxide of the polyphenol will result in the desired product. Solvents which have been found to be particularly useful are benzene, toluene, and methylethyl ketone. Xylene has been used but is less satisfactory than the other solvents.

The proportions of the various reactants are subject to variation. The starting monohydroxy, dihydroxy or trihydroxy compound acts as an acceptor for the oxyalkylation material, e.g., 1,2-propylene oxide or 1,2-butylene oxide, and this acceptor forms a minor proportion of the first adduct. It necessarily follows that the oxyalkylation material, such as, for example, 1,2-propylene oxide or 1,2-butylene oxide, forms a major proportion of the first adduct. Usually, the acceptor is not more than 15 percent by weight of the first adduct and can be as low as 1 or 2 percent by weight of the first adduct.

In the second adduct which is formed by adding ethylene oxide to the first adduct, the optimum quantity of ethylene oxide added will depend upon the chemical constitution of the first adduct. If the oxyalkylene groups present in the first adduct are primarily oxybutylene groups, up to two moles of ethylene oxide can be added per mole of hydroxyl (OH—) in the first adduct, with the preferred range, where the first adduct is a polybutylene glycol, being within the range of 0.7 to 1.1 mole of ethylene oxide per mole of hydroxyl groups in the polybutylene glycol.

If the first adduct consists primarily of oxypropylene groups, the amount of ethylene oxide added preferably does not exceed 0.8 mole per mole of hydroxyl groups in the first adduct and a preferred range is 0.4 to 0.8 mole of ethylene oxide per mole of hydroxyl group in the first adduct.

If the first adduct is made by oxyalkylating a triol or other trihydroxy compound, it is desirable that no more than 0.5 mole of ethylene oxide be added per mole of hydroxyl groups in the first adduct.

It will be seen, therefore, that oxyethylene groups comprise a minor proportion, usually not exceeding 15 percent by weight, and in most cases, below 10 percent by weight of the second adduct. In terms of the amount of ethylene oxide per hydroxyl equivalent, the range will vary from about 0.2 mole of ethylene oxide to 2 moles of ethylene oxide per hydroxyl equivalent (grams of product that would contain 17 grams of hydroxyl). In most cases, the quantity of ethylene oxide per hydroxyl equivalent will not exceed one mole.

On a weight basis the epoxide of the polyphenol will normally constitute a minor proportion of the final product. Thus, it is preferable to react about 12 to 18 parts by weight of the epoxide of the polyphenol with 100 parts by weight of the second adduct.

The extent of oxyalkylation in the preparation of the first adduct will vary but is preferably such that the first adduct has a minimum molecular weight of 500 where it consists primarily of oxybutylene groups and a minimum molecular weight of 1,000 where it consists primarily of oxypropylene groups. In general, a maximum molecular weight of 4,000 is satisfactory in either case. The molecular weight range of 500 to 4,000 also applies where both oxypropylene and oxybutylene groups are present in the first adduct.

In the preferred compositions of the invention the epoxide equivalent of the epoxide of the polyphenol is preferably limited to a minimum of 145 and a maximum below 250. The epoxide equivalent is defined as the number of grams of material containing one epoxide group. Thus, a suitable starting material is a substance known as Epon 828 which is a commercial epoxidized dihydrooxydiphenyldimethylmethane having an average epoxide equivalent of 175 to 210. Other similar commercial products are available and can be employed as the epoxide of the polynuclear phenol. These products for the most part consist principally of the diglycidyl ether of diphenyldimethylmethane. The diglycidyl ether of diphenylmonomethylmethane and the diphenyldiglycidyl ether can be employed as reactants.

The conditions of reaction in forming the first adduct will vary depending upon whether butylene oxide or propylene oxide is employed in the oxyalkylation. In general, where butylene oxide is employed, the temperature will be within the range of 110° to 120°C. Where propylene oxide is employed the temperature will be within the range of 120° to 130°C.

In forming the second adduct where ethylene oxide is employed the temperature range will usually be from 150° to 160°C.

In forming the first adduct a small amount of alkali, as for example, ground caustic potash, is employed as a catalyst. The amount employed will usually be within the range of 0.2 to 0.35 percent by weight of the adduct. This catalyst is also present during the formation of the second adduct.

Superatmospheric pressures are employed in forming the second adduct in accordance with well known oxyethylation procedures.

In forming the final product by reaction of the second adduct with the epoxide of the polyphenol, the quantity of solvent, for example, toluene, is usually within the range of 25 to 75 parts of solvent per 100 parts of the second adduct per 12 to 18 parts of the epoxide of the polyphenol, all calculated by weight. In most cases, good results are obtained by employing about 50 parts by weight of solvent per 100 parts by weight of the second adduct per 16 parts by weight of the epoxide of the polyphenol.

The reaction between the second adduct and the epoxide of the polyphenol is preferably carried out in three temperature stages for the oxyethylated adduct of polybutylene glycol and four temperature stages for the oxyethylated adduct of polypropylene glycol. In the first stage the reactants are digested at around 100°–110°C. At this temperature solvents such as toluene which boils around 110°C. remain in the reaction mixture. In the second stage the heat is increased to a temperature around 130°–135°C. for the oxyethylated adduct of polypropylene glycol and 160° to 170°C. for the oxyethylated adduct of polybutylene glycol. During this stage solvents, such as toluene, are at least partially removed and the viscosity of the reaction mass increases rapidly. After the mixture has become viscous, it is preferable to add a suitable higher boiling hydrocarbon solvent, such as $SO_2$ extract, which boils in the range of about 190° to 235°C. After the addition of the $SO_2$ extract, the mixture containing the oxyethylated adduct of polypropylene glycol is heated to a temperature around 160° to 170°C. After further reaction at a temperature of 160°–170°C. the temperature is raised to about 220°C. During the period of heating to this temperature lower boiling solvents, such as toluene, are removed from the reaction mixture. These lower boiling solvents are collected and can be returned to the product or used for additional reactions. Usually about 60 percent of solvents, such as toluene, are removed at a temperature of 135°C.

The product is normally recovered as a solvent solution which is opalescent or translucent. If the second adduct contains too much ethylene oxide (contains a higher proportion of primary hydroxyl groups to secondary hydroxyl groups) no solids form, a clean, clear solution results which is very viscous for the lower molecular weight polyglycols and which is a gel for the higher molecular weight polyglycols and the product is a poor demulsifier for crude oil petroleum emulsions. If the second adduct contains too little ethylene oxide (contains a lower proportion of primary hydroxyl groups to secondary hydroxyl groups) large amounts of insoluble material is formed and there is little or no increase in viscosity and the product is a poor demulsifier for crude oil petroleum emulsions. If the second adduct contains ethylene oxide within the limits specified, small amounts of insoluble material are formed at the lower temperature, 100°C., and thickening results at the higher temperature, 135°C. for the oxyethylated adduct of polypropylene glycol and 165°C. for the oxyethylated adduct of polybutylene glycol. This results in a solvent solution which is turbid. This turbidity can be noted when the reactants are heated to a temperature of 100°C.

The amount of ethylene oxide (the proportion of primary hydroxyl groups to secondary hydroxyl groups) is extremely important. Since the epoxides of phenols or polyphenols are more reactive toward primary hydroxyl groups than secondary hydroxyl groups at about 100°C., the proportion of primary hydroxyl groups to secondary hydroxyl groups determine the type of copolymer formed when the oxyethylated adduct and the epoxide of polyphenol are reacted.

The final product is an excellent demulsifier for crude oil petroleum emulsions, especially certain types of crude oil petroleum emulsions which do not break readily. This product can be used as such but it is usually preferable to blend it with more highly hydroxylated adducts which are effective to increase the water release in the treatment of a water-in-oil petroleum emulsion. Thus, the demulsifier can contain, for example, 40–85 percent by weight of a solvent solution of a product of the present invention and 60–15 percent by weight of an auxiliary substance to enhance the water release. Of the 40–85 percent portion, approximately 18–22 percent is preferably an active material prepared as herein described if the first adduct is primarily a polybutylene glycol, and approximately 28–32 percent is preferably an active material prepared as herein described if the first adduct is primarily a polypropylene glycol, the remainder in each case being a solvent such as, for example, $SO_2$ extract or a mixture of $SO_2$ extract and toluene.

The preferred composition can be described by the general formula:

$$[(RO)x(C_nH_{2n+1}O)y(CH_2CH_2O)_z]u(R_1)_w$$

where R is a radical from the group consisting of hydrocarbon radicals and hydrocarbon ether radicals containing up to 12 carbon atoms; $R_1$ is the residue of an epoxide of a polyphenol having an epoxide equivalent of at least 145 and below 250; $x$ is 1 to 3; $n$ is 3 to 4; $y$ is 17 to 68 when $n$ is 3 and 7 to 56 when $n$ is 4; $z$ is 0.7 to 1.1 when $n$ is 4 and $x$ is 1 to 2; $z$ is 0.4 to 0.8 when $n$ is 3 and $x$ is 1 to 2; $z$ is 0.2 to 0.5 when $n$ is 3 to 4 and $x$ is 3; $u$ is 3 to 5; and $w$ is 2 to 4.

In terms of weight percentages, the preferred compositions can also be described as the reaction product of an epoxide of a polyphenol having an epoxide equivalent of at least 145 but less than 250 with an oxyethylated adduct consisting of oxybutylene groups or oxypropylene groups added to an acceptor having one, two or three replaceable hydrogen atoms in hydroxyl groups from the class consisting of hydroxy hydrocarbyl compounds and hydroxy hydrocarbyl ether compounds containing up to twelve carbon atoms, the proportion of oxyethylene groups being 0.4 to 15 percent, the proportion of oxyalkylene polyphenol groups being 10 to 20 percent, the proportion of acceptor groups being 1 to 15 percent and the remainder being oxypropylene and/or oxybutylene groups.

One of the preferred products of the invention can be described as a copolymer of a diglycidyl ether of bis-phenol-A with an ethylene oxide adduct of a 1,2-butylene oxide adduct of a 1,3-butylene glycol wherein the 1,2-butylene oxide adduct has a molecular weight of 500 to 4,000, the weight ratio of ethylene oxide to said 1,2-butylene oxide adduct is within the range of 1:19 to 3:17 and the weight ratio of said diglycidyl ether of bis-phenol-A to said ethylene oxide adduct is within the range of 1:10 to 1:5.

Another preferred product of the invention can be described as a copolymer of a diglycidyl ether of bis-phenol-A with an ethylene oxide adduct of a 1,2-propylene oxide adduct of di-1,2-propylene glycol wherein the 1,2-propylene oxide adduct has a molecular weight of 1,000 to 4,000, the weight ratio of ethylene oxide to said 1,2-propylene oxide adduct is within the range of 1:100 to 1:19 and the weight ratio of said diglycidyl ether of bis-phenol-A to said ethylene oxide adduct is within the range of 1:10 to 1:5.

The preferred products are further characterized by the fact that their solvent solution, for example, in toluene or SO₂ extract, are turbid which indicates the presence of copolymers of the oxyethylated adduct and the epoxide of the polyphenol having such a high proportion of the epoxide of the polyphenol that the material is insoluble and having minor amounts of a self-polymer of the epoxide of the polyphenol. The invention, therefore, contemplates mixtures as well as pure products and includes solvent solutions or dispersions of these products.

Sulfur dioxide extract is a by-product from the Edeleneau process of petroleum refining in which the undesirable fractions are removed by extraction with liquid SO₂. After removal of the sulfur dioxide a mixture of hydrocarbons substantially aromatic in character remains and is designated in the trade as sulfur dioxide extract or SO₂ extract. In addition to sulfur dioxide extract, toluene, benzene and methylethyl ketone, the invention contemplates the use of other solvents in which the products are chemically inert.

The invention will be further illustrated but is not limited by the following examples in which the quantities are stated in parts by weight unless otherwise indicated.

PREPARATION OF FIRST AND SECOND ADDUCTS

Example A

To an autoclave equipped with a means of mechanical stirring, heating and cooling, 10.8 parts of 1,3-butylene glycol and 0.25 parts potassium hydroxide were added. The contents of the autoclave was heated to 110°C. At this temperature, 1,2-butylene oxide was slowly introduced from a transfer bomb which contained 75.4 parts of 1,2-butylene oxide; cooling was applied during the addition to maintain the temperature below 115°C. with a pressure of 50–60 psi. Approximately 2 hours were required to introduce the 1,2-butylene oxide; the temperature was then allowed to rise to 150°C. The reaction mass was maintained at this higher temperature for four hours to insure that the unreacted 1,2-butylene oxide was at a minimum. 13.8 parts of ethylene oxide was added from a transfer bomb at such a rate that the temperature was maintained between 150°–160°C. with a pressure of 60–75 psi. After all of the ethylene oxide had been added, the temperature was held at 150°C. for an additional hour to complete the reaction. The molecular weight of the final product was approximately 600.

Example B

To similar equipment as used in Example A, 7.2 parts of 1,3-butylene glycol and 0.25 parts potassium hydroxide were added and heated to 110°C. 83.7 parts of 1,2-butylene oxide and 9.1 parts ethylene oxide were added separately using the same procedure as in Example A. The molecular weight of the final product was approximately 1,000.

Example C

To similar equipment as used in Example A, 4.5 parts of 1,3-butylene glycol and 0.25 parts potassium hydroxide were added and heated to 110°C. 88.9 parts of 1,2-butylene oxide and 6.6 parts ethylene oxide were added separately using the same procedure as in Example A. The molecular weight of the final product was approximately 1,370.

Example D

To similar equipment as used in Example A, 4.1 parts of 1,3-butylene glycol and 0.25 parts potassium hydroxide were added and heated to 110°C. 90.8 parts of 1,2-butylene oxide and 5.1 parts ethylene oxide were added separately using the same procedure as in Example A. The molecular weight of the final product was approximately 1,760.

Example E

To an autoclave equipped with a means of mechanical stirring, heating and cooling, 4.7 parts of dipropylene glycol and 0.25 parts potassium hydroxide were added. The contents of the autoclave was heated to 125°C. At this temperature 1,2-propylene oxide was slowly introduced from a transfer bomb which contained 92.8 parts of 1,2-propylene oxide; cooling was applied during the addition to maintain the temperature below 130°C. with a pressure of 60–75 psi. Approximately two hours were required to introduce the 1,2-propylene oxide; the reaction mass was maintained at 130°C. for four hours to insure that the unreacted 1,2-propylene oxide was at a minimum. 2.5 parts of ethylene oxide was added from a transfer bomb at such a rate that the temperature was maintained between 150° to 160°C. with a pressure of 60–75 psi. After all of the ethylene oxide had been added, the temperature was held at 150°C. for an additional hour to complete the reaction. The molecular weight of the final product was approximately 1,950.

Example F

To similar equipment as used in Example E, 7.2 parts of dipropylene glycol and 0.25 parts potassium hydroxide were added and heated to 125°C. 90.0 parts of 1,2-propylene oxide and 2.8 parts ethylene oxide were added separately using the same procedure as in Example E. The molecular weight of the final product was approximately 1,470.

Example G

To similar equipment as used in Example E 3.0 parts of di-1,2-propylene glycol and 0.25 parts potassium hydroxide were added and heated to 125°C. 95.4 parts of 1,2-propylene oxide and 1.6 parts ethylene oxide were added separately using the same procedure as in Example E. The molecular weight of this product was approximately 2,800.

PREPARATION OF COPOLYMER OF EPOXIDE OF POLYPHENOL

Example H

One hundred parts of the polyglycol prepared in Example A, 16 parts of the diglycidyl ether of bis-phenol-A, and 50 parts of toluene were placed in a three necked flask equipped with a means of mechanical stirring and heating. The mixture was heated to 100°C. and held at that temperature for one hour; the heat again was increased and enough toluene removed so that the remaining mixture refluxed at 165°C. At this stage of the reaction, the viscosity of the reaction mass increased rapidly. After the mixture had become quite viscous, 75 parts of a suitable hydrocarbon solvent, such as SO₂ extract, was added. The temperature was maintained at 165°C., for 1½ hours; during the last hour of this time a slow increase in viscosity was noted; however, no additional solvent was added. After 1½ hours at 165°C. the mixture was heated to 220°C. and held for 30 minutes. During heating to 220°C. all of the toluene was removed. Upon cooling, the toluene which had been removed together with 390 parts of SO₂ extract was added.

Example I

To similar equipment as used in Example H, 100 parts of the polyglycol prepared in Example D, 12 parts of the diglycidyl ether of bis-phenol-A, and 50 parts of toluene were added. The reaction was completed using the same procedure as in Example H. The behavior of this reaction mixture was identical to that in Example H in every respect except the rates of thickening differed. Upon cooling, the toluene which had been removed together with 390 parts of SO₂ extract was added.

Example J

To similar equipment as used in Example H, 100 parts of the polyglycol prepared in Example D, 19 parts of the diglycidyl ether of bis-phenol-A, and 50 parts of toluene were added. The reaction was completed using the same procedure as in Example H. The behavior of this reaction mixture was identical to that in Example H in every respect except the rates of thickening differed. Upon cooling, the toluene which had been removed together with 390 parts of $SO_2$ extract was added.

Example K

To similar equipment as used in Example H, 100 parts of the polyglycol prepared in Example D, 16 parts of the diglycidyl ether of bis-phenol-A, and 50 parts of benzene were added. The reaction was completed using the same procedure as in Example H. The behavior of this reaction mixture was identical to that in Example H in every respect except the rates of thickening differed. Upon cooling, the benzene which had been removed together with 390 parts of $SO_2$ extract was added.

Example L

To similar equipment as used in Example H, 100 parts of the polyglycol prepared in Example D, 16 parts of the diglycidyl ether of bis-phenol-A, and 50 parts of methylethyl ketone were added. The reaction was completed using the same procedure as in Example H. The behavior of this reaction mixture was identical to that in Example H in every respect except the rates of thickening differed. Upon cooling, the methylethyl ketone which had been removed together with 390 parts of $SO_2$ extract was added.

Example M

To similar equipment as used in Example H, 100 parts of the polyglycol prepared in Example B, 16 parts of the diglycidyl ether of bis-phenol-A, and 50 parts of toluene were added. The reaction was completed using the same procedure as in Example H. The behavior of this reaction mixture was identical to that in Example H in every respect except the rates of thickening differed. Upon cooling, the toluene which had been removed together with 390 parts of $SO_2$ extract was added.

Example N

To similar equipment as used in Example H, 100 parts of the polyglycol prepared in Example C, 16 parts of the diglycidyl ether of bis-phenol-A, and 50 parts of toluene were added. The reaction was completed using the same procedure as in Example H. The behavior of this reaction mixture was identical to that in Example H in every respect except the rates of thickening differed. Upon cooling, the toluene which had been removed together with 390 parts of $SO_2$ extract was added.

Example O

To similar equipment as used in Example H, 100 parts of the polyglycol prepared in Example D, 16 parts of the diglycidyl ether of bis-phenol-A, and 50 parts of toluene were added. The reaction was completed using the same procedure as in Example H. The behavior of this reaction mixture was identical to that in Example H in every respect except the rates of thickening differed. Upon cooling, the toluene which had been removed together with 390 parts of $SO_2$ extract was added.

Example P

One hundred parts of the polyglycol prepared in Example E, 16 parts of the diglycidyl ether of bis-phenol-A, and 50 parts of toluene were placed in a three necked flask equipped with a means of mechanical stirring and heating. The mixture was heated to 100°C. and held at that temperature for one hour; the heat was again increased until the mixture refluxed at 135°C. At this stage of the reaction the viscosity of the reaction mass increased rapidly. After the mixture had become quite viscous, 75 parts of a suitable hydrocarbon solvent, such as $SO_2$ extract, was added. Again the heat was increased until the mixture refluxed at 170°C. The viscosity of the reaction mass increased slowly. When the mixture had become very viscous, a second addition of 75 parts of $SO_2$ extract was made. The temperature was maintained at 170°C. for 1½ hours; during the last hour of this time a slow increase in viscosity was noted; however, no additional solvent was added. After 1½ hours at 170°C., the mixture was heated to 220°C. and held for 30 minutes. During heating to 220°C. all of the toluene was removed. Upon cooling, the toluene which had been removed together with 75 parts of $SO_2$ extract was added.

Example Q

To similar equipment as used in Example P, 100 parts of the polyglycol prepared in Example E, 12 parts of the diglycidyl ether of bis-phenol-A, and 50 parts toluene were added. The reaction was completed using the same procedure as in Example P. The behavior of this reaction mixture was identical to that in Example P in every respect except the rates of thickening differed. Upon cooling, the toluene which had been removed together with 75 parts of $SO_2$ extract was added.

Example R

To similar equipment as used in Example P, 100 parts of the polyglycol prepared in Example E, 18 parts of the diglycidyl ether of bis-phenol-A, and 50 parts toluene were added. The reaction was completed using the same procedure as in Example P. The behavior of this reaction mixture was identical to that in Example P in every respect except the rates of thickening differed. Upon cooling, the toluene which had been removed together with 75 parts of $SO_2$ extract was added.

Example S

To similar equipment as used in Example P, 100 parts of the polyglycol prepared in Example E, 16 parts of the diglycidyl ether of bis-phenol-A, and 50 parts benzene were added. The reaction was completed using the same procedure as in Example P. The behavior of this reaction mixture was identical to that in Example P in every respect except the rates of thickening differed. Upon cooling, the benzene which had been removed together with 75 parts of $SO_2$ extract was added.

Example T

To similar equipment as used in Example P, 100 parts of the polyglycol prepared in Example E, 16 parts of the diglycidyl ether of bis-phenol-A, and 50 parts of methylethyl ketone were added. The reaction was completed using the same procedure as in Example P. The behavior of this reaction mixture was identical to that in Example P in every respect except the rates of thickening differed. Upon cooling, the methylethyl ketone which had been removed together with 75 parts of $SO_2$ extract was added.

Example U

To similar equipment as used in Example P, 100 parts of the polyglycol prepared in Example F, 16 parts of the diglycidyl ether of bis-phenol-A, and 50 parts toluene were added. The reaction was completed using the same procedure as in Example P. The behavior of this reaction mixture was identical to that in Example P in every respect except the rates of thickening differed. Upon cooling, the toluene which had been removed together with 75 parts of $SO_2$ extract was added.

Example V

To similar equipment as used in Example P, 100 parts of the polyglycol prepared in Example G, 16 parts of the diglycidyl ether of bis-phenol-A, and 50 parts toluene were added. The reaction was completed using the same procedure as in Example P. The behavior of this reaction mixture was identical to that in Example P in every respect except the rates of thickening differed. Upon cooling, the toluene which had been removed together with 75 parts of $SO_2$ extract was added.

In the foregoing examples, the final adducts of Examples A to D are polybutylene glycols with about one mole of ethylene oxide per hydroxyl. In Examples E to G the final adducts are polypropylene glycols with about 0.5 mole of ethylene oxide per hydroxyl.

The term "hydroxy-hydrocarbyl compound" as used herein means a hydrocarbon in which at least one hydrogen atom has been replaced by a hydroxy group. Thus, monohydric alcohols such as methanol, ethanol, propanol, butanol and higher homologues fall in this category. Likewise, dihydric alcohols are included within the meaning of this term, for example, 1,2-propylene glycol, 1,3-propylene glycol, 1,3-butylene glycol, 1,4-butylene glycol, amylene glycols, hexylene glycols and homologues. Similarly, glycerine and 1,2,6-hexamethylene triol are included.

The term "hydroxy hydrocarbyl ether" as used herein means a hydrocarbon in which at least one hydrogen atom has been replaced by a hydroxy group and which also contains one or more ether oxygen atoms. Thus, alkyl (methyl, ethyl, propyl, butyl, etc.) or aryl (phenyl, tolyl, etc.) ethers of glycols (ethylene glycol, 1,3-propylene glycol, 1,2-propylene glycol, 1,3-butylene glycol, triethylene glycol, tetraethylene glycol, dipropylene glycol, dibutylene glycol), or the polyglycols themselves are in this category.

Since the foregoing acceptor compounds form such a small part of the final products, a propylene glycol, for example, can be substituted for a butylene glycol in the formation of an adduct with butylene oxide or a butylene glycol can be substituted for propylene glycol in the formation of an adduct with propylene oxide. In order to obtain optimum demulsifier properties, the quantity of ethylene oxide which supplies the primary hydroxyl groups for further reaction with the epoxide of the polyphenol is more critical. The oxyethylene groups also affect the hydrophilehydrophobe balance of the final product.

IMPROVEMENT INVENTION HEREIN

The invention herein concerns improvements in demulsifying properties of the compounds heretofore described by reacting the diglycidyl ether of a bis-phenol compound with, as well as the aforesaid terminally oxyethylated, higher alkylene oxide adducts of the hydroxy hydrocarbyl compound or hydroxy hydrocarbyl ether, a polyoxylalkylated alkyl phenol. The demulsifiers of the improvement may be characterized as a substantially water-insoluble, at least partially oil-soluble product formed by the reaction of (A) a polyoxyalkylene alcohol in which the oxyalkylene groups consist essentially of a member from the group consisting of oxypropylene, oxybutylene, and both oxypropylene and oxybutylene, with at least one terminal 2-hydroxyethyl group and (B) a diglycidyl ether of a bis-phenol compound in which about 60 to 90 percent of said diglycidyl ether groups are reacted with the hydroxyl groups of said polyoxyalkylene glycol with the formation of ether linkages between the polyoxyalkylene glycol nuclei and the bis-phenol compound nuclei, the remaining, unreacted glycidyl ether groups of the resultant product being reacted with hydroxyl groups on (C) polyoxyalkylene groups of a polyoxyalkylated alkyl phenolformaldehyde polycondensate with the formation of ether linkages between said reaction product of (A) and (B) and said polyoxyalkylated polycondensate, the alkyl groups of the phenol of (C) having an average of four to 15 carbons, said polycondensate having an average of about four to 15 phenolic nuclei per molecule, the oxyalkylene groups of (C) being selected from the group consisting of oxyethylene, oxypropylene, and both oxyethylene and oxypropylene, and the weight ratio of said last-mentioned oxyalkylene groups to said alkyl phenol-formaldehyde polycondensate being in the range of about 1:5 to 15:1, respectively. The reaction of the hydroxyl groups on the polyoxyalkylated alkyl phenol-formaldehyde polycondensate (C) and the remaining unreacted glycidal ether groups of the reaction product of (A) and (B) is carried out in a hydrocarbon solvent at a temperature range from 140° to 210° C.

ALKYL PHENOL-FORMALDEHYDE CONDENSATION

The phenol-formaldehyde condensation products are prepared by reacting formaldehyde or a substance which breaks down to formaldehyde under the reaction conditions, e.g., para-formaldehyde and trioxane, and a difunctional alkyl phenol, often preferably crude mixture of alkyl phenols for economic reasons, by heating the reactants at 100°–125°C. in the presence of a small amount of an acid catalyst such as sulfamic acid or muriatic acid and preferably under substantially anhydrous conditions —excepting the water produced during the reaction. The aqueous distillate which begins to form is collected and removed from the reaction mixture. After several hours of heating at temperatures slightly above the boiling point of water, the mass becomes viscous and is permitted to cool to about 100° to 105°C. At this point a suitable hydrocarbon fraction is added, and heating is resumed. Further aqueous distillate begins to form, and heating is continued for an additional number of hours until at least about one mol of aqueous distillate per mol of the formaldehyde has been secured. The temperature at the end of the reaction reaches about 180°–250° C. The product is permitted to cool to yield the phenol-formaldehyde condensation product in a hydrocarbon solvent. The molecular weight of these intermediate condensation products cannot be ascertained with certainty, but we would approximate that the resins employed herein should contain about four to 15, preferably four to 10, phenolic nuclei per resin molecule. The solubility of the condensation product in hydrocarbon solvent would indicate that the resin is a linear type polymer, thus distinguishing them from the more common phenol-formaldehyde resins of the cross-linked type.

OXYALKYLATION OF THE ALKYL PHENOL-FORMALDEHYDE CONDENSATION PRODUCT

Having prepared the intermediate phenol-formaldehyde products, the next step is the oxyalkylation of the condensation products with the alkylene oxides having two to three carbons. This is achieved by mixing the intermediate phenol-formaldehyde condensation product in a hydrocarbon solvent with a small amount of a suitable catalyst in an autoclave. The condensation product is heated above 100°C., and ethylene oxide or a mixture of ethylene oxide and propylene oxide, either as a mixture of by sequential addition of first either the propylene oxide or the ethylene oxide and later the other oxide, is charged into the autoclave until the pressure is in the vicinity of 75–100 p.s.i.

The reaction mixture is gradually heated until an exothermic reaction begins. The external heating is then removed, and alkylene oxide is added at such a rate that the temperature is maintained between about 130°–160°C. in a pressure range of 80 to 100 p.s.i. After all of the alkylene oxide has been added, the temperature is maintained for an additional 10 to 20 minutes to assure substantially complete reaction of the alkylene oxide. The resulting product is the alkylene oxide adduct of an alkyl phenolformaldehyde condensation product, in which the weight ratio of the oxide to the condensation product is between about 1:5 and 15:1, preferably between about 1:5 and 5:1.

REACTION PRODUCTS CONSTITUTING THE IMPROVEMENT

The examples hereafter provided are broken down into Groups A, B, C, D and E. Group A relates to polyoxybutylene glycols and polyoxybutylene glycols which are oxyethylated with about one-half to one mol of ethylene oxide per mol equivalent of glycol hydroxyl. Group B relates to alkyl phenol-formaldehyde polycondensates, while Group C relates to the oxyalkylation products thereof. Groups D and E pertain to reaction products of the condensates of Group C, diglycidyl ethers of bis-phenols and the polyoxybutylene glycols and polyoxypropylene glycols of Group A.

As aforesaid, the reaction products herein comprise a substantially water-insoluble, at least partially oil-soluble product formed by the reaction of (A) a polyoxyalkylene alcohol in which the oxyalkylene groups consist essentially of a member from the group consisting of oxypropylene, oxybutylene, and both oxypropylene and oxybutylene, with at least one terminal 2-hydroxyethyl group and (B) a diglycidyl ether of a bis-phenol compound in which about 60 to 90 percent of said diglycidyl ether groups are reacted with the hydroxyl ether linkages between the polyoxyalkylene glycol nuclei and the bis-phenol compound nuclei, the remaining, unreacted glycidyl ether groups of the resultant product being reacted with hydroxyl groups on (C) polyoxyalkylene groups of a polyoxyalkylated alkyl phenol-formaldehyde polycondensate with the formation of ether linkages between said reaction product of (A) and (B) and said polyoxyalkylated polycondensate, the alkyl groups of the phenol of (C) having an average of four to 15 carbons, said polycondensate having an average of about four to 15 phenolic nuclei per molecule, the oxyalkylene groups of (C) being selected from the group consisting of oxyethylene, oxypropylene, and both oxyethylene and oxypropylene, and the weight ratio of said last-mentioned oxyalkylene groups to said alkyl phenol-formaldehyde polycondensate being in the range of about 1:5 to 15:1, respectively.

Examples thereof are as follows, wherein the parts and percentages are by weight unless otherwise indicated.

EXAMPLE A1

Forty-five parts of 1,3-butylene glycol and 2.5 parts of potassium hydroxide are charged into an oxyalkylation autoclave. The contents are heated up to 110°C. while purging the contents and autoclave with natural gas. Addition of 1,2-butylene oxide is begun, holding the reaction temperature at or below 115°C. during the initial butylene oxide addition. The addition of butylene oxide to a total of 903 parts is completed at 110°–115°C., whereupon the reactor contents are recycled over a period of 4–6 hours while the temperature slowly increases to about 150°C.

The resultant polyoxybutylated 1,3-butylene glycol is oxyethylated in the same or similar apparatus with about 52 parts of ethylene oxide to convert the product to about a 0.85 mol of adducted ethylene oxide per hydroxyl equivalent weight of the polyoxybutylated 1,3-butylene glycol.

EXAMPLE A2

To an oxyalkylation autoclave equipped with a means of mechanical stirring, heating and cooling, 3.0 parts of dipropylene glycol and 0.25 parts potassium hydroxide were added and heated to 125°C. At this temperature propylene oxide was slowly introduced from a transfer bomb which contained 95.4 parts of propylene oxide; cooling was applied during the addition to maintain the temperature below 130°C. with a pressure of 60–75 p.s.i. Approximately 2 hours were required to introduce the propylene oxide; the reaction mass was maintained at 130°C. for 4 hours to insure that the unreacted propylene oxide was at a minimum. 1.6 parts of ethylene oxide was added from a transfer bomb at such a rate that the temperature was maintained between 150°–160°C. with a pressure of 60–75 p.s.i. After all of the ethylene oxide had been added, the temperature was held at 150°C. for an additional hour to complete the reaction.

EXAMPLE B1

In a suitable reaction vessel, 6,000 parts of p-nonyl phenol, 900 parts of paraformaldehyde, and 55 parts of muriatic acid, the latter is catalyst, are heated to 38°–40°C. Heating is diminished and the temperature is allowed to approach 100°C. slowly. The reactants are held at 95°–100°C. for about 5 hours.

Upon raising the temperature slowly to 115°C., 2,600 parts of aromatic hydrocarbon solvent is added. Heating is continued to 220°C. where it is held for 1 hour before cooling. Water of reaction which is driven off is collected and removed.

EXAMPLE B2

In a suitable reaction vessel, 4,800 pounds of preheated p-sec.-butyl phenol and 2,000 parts of aromatic hydrocarbon solvent are held at 80°–90°C. whereupon 72 parts of muriatic acid is added to the liquid mixture. Paraformaldehyde is slowly added until the amount added reaches 1,100 parts while holding the temperature at 90°–100°C. during addition and 4 hours thereafter.

The temperature is raised slowly while removing about 755 parts of aqueous distillate. Heating is continued up to 200°C., and the temperature is held at 200°–210°C. for 1 hour. Upon cooling the reaction product to 150°C., an additional 3225 parts of the aromatic hydrocarbon solvent is added.

EXAMPLE B3

In a suitable reaction vessel, 4,800 parts of p-tert.-butyl phenol and 503 parts of an aromatic hydrocarbon solvent are heated to 85°–90°C. When the butyl phenol has melted, heating is stopped and 35 parts of muriatic acid is added. Then 1,120 parts of paraformaldehyde is added slowly while holding the temperature to 90°–100°C. The reaction mixture is held at 95°C. for 2½ hours, whereupon 997 parts of aromatic hydrocarbon solvent is added. Then heating is continued for an additional 1½ hours at 95°C. At the end of this period the temperature is raised slowly to 115°C. while driving off 585–625 parts of water of reaction.

Then an additional 997 parts of aromatic hydrocarbon solvent is added to reduce the viscosity. The reaction temperature is then raised and held at 200°–210°C. for one hour. A total of about 700–750 parts of water of reaction is driven off.

EXAMPLE C1

The phenol-formaldehyde condensate solution of Example B1 is oxyethylated as follows. The solution and about 0.165 percent, based on the total charge, of ground potassium hydroxide is charged into the oxyalkylation autoclave and the contents are heated to 150°C. while purging thoroughly the autoclave with natural gas. Ethylene oxide is added slowly at 150°–160°C. until the total quantity of added ethylene oxide is about 30 percent of the total charge, including the ethylene oxide. The reaction contents are recycled for two hours after ethylene oxide addition has been completed.

EXAMPLE C2

The procedure of Example C1 is repeated with a charge of about 0.18 percent of ground potassium hydroxide and a charge of about 38 percent of ethylene oxide, each percentage being on the basis aforedescribed.

EXAMPLE C3

The procedure of Example C1 is repeated with a charge of about 0.20 percent of ground potassium hydroxide and a charge of about 45 percent of ethylene oxide, each percentage being on the basis aforedescribed.

EXAMPLE C4

The procedure of Example C1 is repeated with a charge of about 0.97 percent of ground potassium hydroxide and a charge of about 53.5 percent of ethylene oxide, each percentage being on the basis aforedescribed.

EXAMPLE C5

The phenol-formaldehyde condensate solution of Example B3 and 0.15 percent, based on the total charge, of ground potassium hydroxide is charged into the oxyalkylation autoclave. The procedure of Example C1 is followed except that the alkylene oxide comprises thoroughly pre-mixed ethylene oxide and 1,2-propylene oxide at a weight ratio of about 2:1, respectively, and the total amount of the alkylene oxide mixture constitutes 20 percent of the total charge, including said oxides.

EXAMPLE C6

The procedure of Example C5 is repeated with 300 parts by weight of the same phenol-formaldehyde condensate solution, 75 parts of each of ethylene oxide and 1,2-propylene oxide, and 0.9 parts of ground KOH.

EXAMPLE C7

The procedure of Example C5 is repeated at ratios of reactants wherein the same phenol-formaldehyde condensate solution constitutes 70 percent of the total charge; ethylene oxide, 22.5% thereof; 1,2-propylene oxide, 7.5% thereof; and ground KOH, 0.083 percent thereof.

EXAMPLE C8

The procedure of Example C5 is repeated at ratios of reactants wherein the same phenol-formaldehyde condensate solution constitutes 80 percent of the total charge; ethylene oxide, 10% thereof; 1,2-propylene oxide, 10 percent thereof; and ground KOH, 0.15 percent thereof.

EXAMPLE C9

The procedure of Example C1 is followed with the use of, based on the total charge, of 82.5 percent of the phenol-formaldehyde condensate solution of Example B2, 17.5 percent of ethylene oxide, and 0.2 percent of ground KOH.

EXAMPLE C10

The procedure of Example C9 is repeated with 2,000 parts of the phenol-formaldehyde condensate of Example B3, 540 parts of ethylene oxide and 4.5 parts of ground KOH.

EXAMPLE C11

The procedure of Example C9 is repeated with 2230 parts of the phenol-formaldehyde condensate of Example B3, 895 parts of ethylene oxide and 5 parts of ground KOH.

EXAMPLE C12

The procedure of Example C5 is repeated with the phenol-formaldehyde condensate solution of Example B2, at a ratio of reactants providing the following percentages of the total charge: condensate solution of Example B2, 8.9 percent; ethylene oxide, 19.7 percent; 1,2-propylene oxide, 71.2 percent; and ground KOH, 0.2 percent.

EXAMPLE C13

The phenol-formaldehyde condensate solution of Example B2 is sequentially oxypropylated and oxyethylated by charging an oxyalkylation autoclave with 291 parts of said solution and two parts of ground KOH. The autoclave contents are heated to 130°C. while thoroughly purging the autoclave with natural gas, after which 2,582 parts of 1,2-propylene oxide are added slowly at 130°–135°C. The autoclave contents are recycled for 3 hours at 130°–135°C. after all of the propylene oxide has been added.

Then, the temperature is raised to 150°C., 127 parts of ethylene oxide are added slowly at 150°–160°C., and, after completion of the ethylene oxide addition, the contents are recycled for 1 hour at 150°–160°C.

For additional examples of oxyalkylated alkyl phenol-formaldehyde condensates useful herein, reference is made to the pertinent Examples of U.S. Pat. Nos. 3,084,124 and 3,024,124.

EXAMPLE D1

One hundred parts of the polyglycol prepared in Example A1, 20 parts of the diglycidyl ether of bisphenol A and 50 parts of toluene were placed in a three-necked flask equipped with a means of mechanical stirring and heating. The mixture was heated to 100°C. and held at that temperature for 1 hour; the heat was again increased until the mixture refluxed at 140°C. After refluxing at 140°C. for 1 hour, 100 parts of the oxyalkylated resin prepared in Example C1 and 100 parts of a suitable hydrocarbon solvent, such as $SO_2$ extract, were added. Again the heat was increased until the mixture attained a temperature of 165°C. The viscosity of the reaction mass increased slowly. When the mixture had become very viscous, 100 parts of $SO_2$ extract was added. The temperature was maintained at 160°C. for 3 hours; during the last hour of this time, the viscosity began to slowly increase, and a second addition of 100 parts of $SO_2$ extract was made. After three hours at 165°C., the mixture was heated to 210°C. and cooled. Upon cooling the toluene which had been removed together with 300 parts of $SO_2$ extract was added.

EXAMPLE D2

To similar equipment as used in Example D1, 100 parts of the polyglycol prepared in Example A1, 24 parts of the diglycidyl ether of bisphenol A and 50 parts toluene were added. The mixture was heated to 100°C. and held at that temperature for one hour; the heat was again increased until the mixture refluxed at 140°C. After refluxing at 140°C. for 1 hour; the heat was again increased until the mixture refluxed at 140°C. After refluxing at 140°C. for 1 hour, 100 parts of the oxyalkylated resin prepared in Example C1 and 100 parts of $SO_2$ extract were added. The reaction was completed using the same procedure as in Example D1. The behavior of this reaction mixture was identical to that in Example D1 in every respect except that the rates of thickening differed. Upon cooling, the toluene which had been removed together with 300 parts of $SO_2$ extract was added.

EXAMPLE D3

To similar equipment as used in Example D1, 100 parts of the polyglycol prepared in Example A1, 24 parts of the diglycidyl ether of bisphenol A and 50 parts toluene were added. The mixture was heated to 100°C. and held at that temperature for 1 hour; the heat was again increased until the mixture refluxed at 140°C. After refluxing at 140°C. for one hour, 200 parts of the oxyalkylated resin prepared in Example C1 and 200 parts of $SO_2$ extract were added. The reaction was completed using the same procedure as in Example D1. The behavior of this reaction mixture was identical to that in Example D1 in every respect except that the rates of thickening differed. Upon cooling, the toluene which had been removed together with 300 parts of $SO_2$ extract was added.

EXAMPLE D4

To similar equipment as used in Example D1, 100 parts of the polyglycol prepared in Example A1, 24 parts of the diglycidyl ether of bisphenol A and 50 parts toluene were added. The mixture was heated to 100°C. and held at that temperature for 1 hour; the heat was again increased until the mixture refluxed at 140°C. After refluxing at 140°C. for 1 hour, 300 parts of the oxyalkylated resin prepared in Example C1 and 300 parts of $SO_2$ extract were added. The reaction was completed using the same procedure as in Example D1. The behavior of this reaction mixture was identical to that in Example D1 in every respect except that the rates of thickening differed. Upon cooling, the toluene which had been removed together with 300 parts of $SO_2$ extract was added.

EXAMPLE D5

To similar equipment as used in Example D1, 100 parts of the polyglycol prepared in Example A1, 20 parts of the diglycidyl ether of bisphenol A and 50 parts toluene were added. The mixture was heated to 100°C. and held at that temperature for 1 hour; the heat was again increased until the mixture refluxed at 140°C. After refluxing at 140°C. for 1 hour, 100 parts of the oxyalkylated resin prepared in Example C2 and 100 parts of $SO_2$ extract were added. The reaction was completed using the same procedure as in Example D1. The behavior of this reaction mixture was identical to that in Example D1 in every respect except that the rates of thickening differed. Upon cooling, the toluene which had been removed together with 300 parts of $SO_2$ extract was added.

EXAMPLE D6

To similar equipment as used in Example D1, 100 parts of the polyglycol prepared in Example A1, 20 parts of the diglycidyl ether of bisphenol A and 50 parts toluene were added. The mixture was heated to 100°C. and held at that temperature for 1 hour; the heat was again increased until the mixture refluxed at 140°C. After refluxing at 140°C. for 1 hour, 100 parts of the oxyalkylated resin prepared in Example C3 and 100 parts of $SO_2$ extract were added. The reaction was completed using the same procedure as in Example D1. The behavior of this reaction mixture was identical to that in Example D1 in every respect except that the rates of thickening differed. Upon cooling, the toluene which had been removed together with 300 parts of $SO_2$ extract was added.

EXAMPLE D7

To similar equipment as used in Example D1, 100 parts of the polyglycol prepared in Example A1, 20 parts of the diglycidyl ether of bisphenol A and 50 parts toluene were added. The mixture was heated to 100°C and held at that temperature for 1 hour; the heat was again increased until the mixture refluxed at 140°C. After refluxing at 140°C. for 1 hour, 100 parts of the oxyalkylated resin prepared in Example C4 and 100 parts of $SO_2$ extract were added. The reaction was completed using the same procedure as in Example D1. The behavior of this reaction mixture was identical to that in Example D1 in every respect except that the rates of thickening differed. Upon cooling, the toluene which had been removed together with 300 parts of $SO_2$ extract was added.

EXAMPLE D8

To similar equipment as used in Example D1, 100 parts of the polyglycol prepared in Example A1, 20 parts of the diglycidyl ether of bisphenol A and 50 parts toluene were added. The mixture was heated to 100°C. and held at that temperature for 1 hour; the heat was again increased until the mixture refluxed at 140°C. After refluxing at 140°C. for 1 hour, 100 parts of the oxyalkylated resin prepared in Example C5 and 100 parts of $SO_2$ extract were added. The reaction was completed using the same procedure as in Example D1. The behavior of this reaction mixture was identical to that in Example D1 in every respect except that the rates of thickening differed. Upon cooling, the toluene which had been removed together with 300 parts of $SO_2$ extract was added.

EXAMPLE D9

To similar equipment as used in Example D1, 100 parts of the polyglycol prepared in Example A1, 20 parts of the diglycidyl ether of bisphenol A and 50 parts toluene were added. The mixture was heated to 100°C. and held at that temperature for 1 hour; the heat was again increased until the mixture refluxed at 140°C. After refluxing at 140°C. for 1 hour, 100 parts of the oxyalkylated resin prepared in Example C6 and 100 parts of $SO_2$ extract were added. The reaction was completed using the same procedure as in Example D1. The behavior of this reaction mixture was identical to that in Example D1 in every respect except that the rates of thickening differed. Upon cooling, the toluene which had been removed together with 300 parts of $SO_2$ extract was added.

EXAMPLE D10

To similar equipment as used in Example D1, 100 parts of the polyglycol prepared in Example A1, 20 parts of the diglycidyl ether of bisphenol A and 50 parts toluene were added. The mixture was heated to 100°C. and held at that temperature for 1 hour; the heat was again increased until the mixture refluxed at 140°C. After refluxing at 140°C. for 1 hour, 100 parts of the oxyalkylated resin prepared in Example C7 and 100 parts of $SO_2$ extract were added. The reaction was completed using the same procedure as in Example D1. The behavior of this reaction mixture was identical to that in Example D1 in every respect except that the rates of thickening differed. Upon cooling, the toluene which had been removed together with 300 parts of $SO_2$ extract was added.

EXAMPLE D11

To similar equipment as used in Example D1, 100 parts of the polyglycol prepared in Example A1, 20 parts of the diglycidyl ether of bisphenol A and 50 parts toluene were added. The mixture was heated to 100°C. and held at that temperature for 1 hour; the heat was again increased until the mixture refluxed at 140°C. After refluxing at 140°C. for 1 hour, 100 parts of the oxyalkylated resin prepared in Example C8 and 100 parts of $SO_2$ extract were added. The reaction was completed using the same procedure as in Example D1. The behavior of this reaction mixture was identical to that in Example D1 in every respect except that the rates of thickening differed. Upon cooling, the toluene which had been removed together with 300 parts of $SO_2$ extract was added.

EXAMPLE D12

To similar equipment as used in Example D1, 100 parts of the polyglycol prepared in Example A1, 20 parts of the diglycidyl ether of bisphenol A and 50 parts toluene were added. The mixture was heated to 100°C. and held at that temperature for 1 hour; the heat was again increased until the mixture refluxed at 140°C. After refluxing at 140°C. for 1 hour, 100 parts of the oxyalkylated resin prepared in Example C9 and 100 parts of $SO_2$ extract were added. The reaction was completed using the same procedure as in Example D1. The behavior of this reaction mixture was identical to that in Example D1 in every respect except that the rates of thickening differed. Upon cooling, the toluene which had been removed together with 300 parts of $SO_2$ extract was added.

EXAMPLE D13

To similar equipment as used in Example D1, 100 parts of the polyglycol prepared in Example A1, 20 parts of the diglycidyl ether of bisphenol A and 50 parts toluene were added. The mixture was heated to 100°C. and held at that temperature for 1 hour; the heat was again increased until the mixture refluxed at 140°C. After refluxing at 140°C. for 1 hour, 100 parts of the oxyalkylated resin prepared in Example C10 and 100 parts of $SO_2$ extract were added. The reaction was completed using the same procedure as in Example D1. The behavior of this reaction mixture was identical to that in Example D1 in every respect except that the rates of thickening differed. Upon cooling, the toluene which had been removed together with 300 parts of $SO_2$ extract was added.

EXAMPLE D14

To similar equipment as used in Example D1, 100 parts of the polyglycol prepared in Example A1, 20 parts of the diglycidyl ether of bisphenol A and 50 parts toluene were added. The mixture was heated to 100°C. and held at that temperature for 1 hour; the heat was again increased until the mixture refluxed at 140°C. After refluxing at 140°C. for 1 hour, 100 parts of the oxyalkylated resin prepared in Example C11 and 100 parts of $SO_2$ extract were added. The reaction was completed using the same procedure as in Example D1. The behavior of this reaction mixture was identical to that in Example D1 in every respect except that the rates of thickening differed. Upon cooling, the toluene which had been removed together with 300 parts of $SO_2$ extract was added.

EXAMPLE D15

To similar equipment as used in Example D1, 100 parts of the polyglycol prepared in Example A1, 20 parts of the diglycidyl ether of bisphenol A and 50 parts toluene were added. The mixture was heated to 100°C. and held at that temperature for 1 hour; the heat was again increased until the mixture refluxed at 140°C. After refluxing at 140°C. for one hour, 100 parts of the oxyalkylated resin prepared in Example C12 and 100 parts of $SO_2$ extract were added. The reaction was completed using the same procedure as in Example D1. The behavior of this reaction mixture was identical to that in Example D1 in every respect except that the rates of thickening differed. Upon cooling, the toluene which had been removed together with 300 parts of $SO_2$ extract was added.

EXAMPLE D16

To similar equipment as used in Example D1, 100 parts of the polyglycol prepared in Example A1, 20 parts of the diglycidyl ether of bisphenol A and 50 parts toluene were added. The mixture was heated to 100°C. and held at that temperature for 1 hour; the heat was again increased until the mixture refluxed at 140°C. After refluxing at 140°C. for 1 hour, 100 parts of the oxyalkylated resin prepared in Example C13 and 100 parts of $SO_2$ extract were added. The reaction was completed using the same procedure as in Example D1. The behavior of this reaction mixture was identical to that in Example D1 in every respect except that the rates of thickening differed. Upon cooling, the toluene which had been removed together with 300 parts of $SO_2$ extract was added.

EXAMPLE D17

To similar equipment as used in Example D1, 100 parts of the polyglycol prepared in Example A1, 20 parts of the diglycidyl ether of bisphenol A and 50 parts toluene were added. The mixture was heated to 100°C. and held at that temperature for 1 hour; the heat was again increased until the mixture refluxed at 140°C. After refluxing at 140°C. for 1 hour, 100 parts of the phenol formaldehyde resin prepared in Example B1 and 100 parts of $SO_2$ extract were added. The reaction was completed using the same procedure as in Example D1. The behavior of this reaction mixture was identical to that in Example D1 in every respect except that the rates of thickening differed. Upon cooling, the roluene which had been removed together with 300 parts of $SO_2$ extract was added.

EXAMPLE D18

To similar equipment as used in Example D1, 100 parts of the polyglycol prepared in Example A1, 20 parts of the diglycidyl ether of bisphenol A and 50 parts toluene were added. The mixture was heated to 100°C. and held at that temperature for 1 hour; the heat was again increased until the mixture refluxed at 140°C. After refluxing at 140°C. for 1 hour, 50 parts of the oxyalkylated resin prepared in Example C10, 50 parts of the phenol formaldehyde resin prepared in Example B1 and 100 parts of $SO_2$ extract were added. The reaction was completed using the same procedure as in Example D1. The behavior of this reaction mixture was identical to that in Example D1 in every respect except that the rates of thickening differed. Upon cooling, the toluene which had been removed together with 300 parts of $SO_2$ extract was added.

EXAMPLE D19

To similar equipment as used in Example D1, 100 parts of the polyglycol prepared in Example A1, 20 parts of the diglycidyl ether of bisphenol A and 50 parts toluene were added. The mixture was heated to 100°C. and held at that temperature for 1 hour; the heat was again increased until the mixture refluxed at 140°C. After refluxing at 140°C. for 1 hour, 100 parts of the phenol formaldehyde resin prepared in Example B2 and 100 parts of $SO_2$ extract were added. The reaction was completed using the same procedure as in Example D1. The behavior of this reaction mixture was identical to that in Example D1 in every respect except that the rates of thickening differed. Upon cooling, the toluene which had been removed together with 300 parts of $SO_2$ extract was added.

EXAMPLE D20

To similar equipment as used in Example D1, 100 parts of polyglycol prepared in Example A1, 20 parts of the diglycidyl ether of bisphenol A and 50 parts benzene were added. The mixture was heated to 100°C. and held at that temperature for 1 hour; the heat was again increased until the mixture refluxed at 140°C. After refluxing at 140°C. for 1 hour, 100 parts of the oxyalkylated resin prepared in Example C1 and 100 parts of $SO_2$ extract were added. The reaction was completed using the same procedure as in Example D1. The behavior of this reaction mixture was identical to that in Example D1 in every respect except that the rates of thickening differed. Upon cooling, the benzene which had been removed together with 300 parts of $SO_2$ extract was added.

EXAMPLE D21

To similar equipment as used in Example D1, 100 parts of the polyglycol prepared in Example A1, 20 parts of the diglycidyl ether of bisphenol A and 50 parts methyl ethyl ketone were added. The mixture was heated to 100°C. and held at that temperature for 1 hour; the heat was again increased until the mixture refluxed at 140°C. After refluxing at 140°C. for 1 hour, 100 parts of the oxyalkylated resin prepared in Example C1 and 100 parts of $SO_2$ extract were added. The reaction was completed using the same procedure as in Example D1. The behavior of this reaction mixture was identical to that in Example D1 in every respect except that the rates of thickening differed. Upon cooling, the methyl ethyl ketone which had been removed together with 300 parts of $SO_2$ extract was added.

EXAMPLE D22

To similar equipment as used in Example D1, 100 parts of the polyglycol prepared in Example A1, 20 parts of the diglycidyl ether of bisphenol A and 50 parts xylene were added. The mixture was heated to 100°C. and held at that temperature for 1 hour; the mixture was then heated to 140°C. and held at that temperature for 1 hour. Then 100 parts of the oxyalkylated resin prepared in Example $C_1$ and 100 parts of $SO_2$ extract were added. The reaction was completed using the same procedure as in Example D1. The behavior of this reaction mixture was identical to that in Example D1 in every respect except that the rates of thickening differed. Upon cooling, the xylene which had been removed together with 300 parts of $SO_2$ extract was added.

EXAMPLE E1

One hundred parts of the polyglycol prepared in Example A2 and 20 parts of the diglycidyl ether of bisphenol A were placed in a three-necked flask equipped with a means of mechanical stirring and heating. The mixture was heated to 100°C. and held at that temperature for 1 hour; 100 parts of the oxyalkylated resin prepared in Example C1 and 100 parts of $SO_2$ extract were then added. The heat was increased and the temperature slowly rose to 140°C. (The temperature rose from 100° to 140°C. over a period of 1 hour). The viscosity of the reaction increased slowly. When the mixture had become very viscous, 100 parts of $SO_2$ extract were added. The temperature was maintained at 140°C. for 1 hour; the heat was again increased until the mixture attained a temperature of 165°C. The viscosity of the reaction mass again increased and a second addition of 100 parts of $SO_2$ extract was made. After 2 hours at 165°C., the mixture was heated to 210°C. and cooled. Upon cooling, 100 parts of $SO_2$ extract was added.

EXAMPLE E2

One hundred parts of the polyglycol prepared in Example A2 and 24 parts of the diglycidyl ether of bisphenol A were placed in a three-necked flask equipped with a means of mechanical stirring and heating. The mixture was heated to 100°C. and held at that temperature for 1 hour; 200 parts of the oxyalkylated resin prepared in Example C1 and 200 parts of $SO_2$ extract were then added. The reaction was completed using the same procedure as in Example E1. The behavior of the reaction mixture was identical to that in Example E1 in every respect except that the rates of thickening differed. Upon cooling, 100 parts of $SO_2$ were added.

EXAMPLE E3

One hundred parts of the polyglycol prepared in Example A2 and 24 parts of the diglycidyl ether of bisphenol A were placed in a three-necked flask equipped with a means of mechanical stirring and heating. The mixture was heated to 100°C. and held at that temperature for 1 hour; 300 parts of the oxyalkylated resin prepared in Example C1 and 300 parts of $SO_2$ extract were then added. The reaction was completed using the same procedure as in Example E-1. The behavior of the reaction mixture was identical to that in Example E1 in every respect except that the rates of thickening differed. Upon cooling, 100 parts of $SO_2$ extract were added.

EXAMPLE E4

One hundred parts of the polyglycol prepared in Example A2 and 16 parts of the diglycidyl ether of bisphenol A were placed in a three-necked flask equipped with a means of mechanical stirring and heating. The mixture was heated to 100°C. and held at that temperature for 1 hour; 100 parts of the oxyalkylated resin prepared in Example C1 and 100 parts of $SO_2$ extract were then added. The reaction was completed using the same procedure as in Example E1. The behavior of the reaction mixture was identical to that in Example E1 in every respect except that the rates of thickening differed. Upon cooling, 100 parts of $SO_2$ extract were added.

EXAMPLE E5

One hundred parts of the polyglycol prepared in Example A2 and 20 parts of the diglycidyl ether of bisphenol A were placed in a three-necked flask equipped with a means of mechanical stirring and heating. The mixture was heated to 100°C. and held at that temperature for 1 hour; 100 parts of the oxyalkylated resin prepared in Example C2 and 100 parts of $SO_2$ extract were then added. The reaction was completed using the same procedure as in Example E1. The behavior of the reaction mixture was identical to that in Example E1 in every respect except that the rates of thickening differed. Upon cooling, 100 parts of $SO_2$ extract were added.

EXAMPLE E6

One hundred parts of the polyglycol prepared in Example A2 and 20 parts of the diglycidyl ether of bisphenol A were placed in three-necked flask equipped with a means of mechanical stirring and heating. The mixture was heated to 100°C. and held at that temperature for 1 hour; 100 parts of the oxyalkylated resin prepared in Example C3 and 100 parts of $SO_2$ extract were then added. The reaction was completed using the same procedure as in Example E1. The behavior of the reaction mixture was identical to that in Example E1 in every respect except that the rates of thickening differed. Upon cooling, 100 parts of $SO_2$ extract were added.

EXAMPLE E7

One hundred parts of the polyglycol prepared in Example A2 and 20 parts of the diglycidyl ether of bisphenol A were placed in a three-necked flask equipped with a means of mechanical stirring and heating. The mixture was heated to 100°C. and held at that temperature for 1 hour; 100 parts of the oxyalkylated resin prepared in Example C4 and 100 parts of $SO_2$ extract were then added. The reaction was completed using the same procedure as in Example E1. The behavior of the reaction mixture was identical to that in Example E1 in every respect except that the rates of thickening differed. Upon cooling, 100 parts of $SO_2$ extract were added.

EXAMPLE E8

One hundred parts of the polyglycol prepared in Example A2 and 20 parts of the diglycidyl ether of bisphenol A were placed in a three-necked flask equipped with a means of mechanical stirring and heating. The mixture was heated to 100°C. and held at that temperature for 1 hour; 100 parts of the oxyalkylated resin prepared in Example C5 and 100 parts of $SO_2$ extract were then added. The reaction was completed using the same procedure as in Example E1. The behavior of the reaction mixture was identical to that in Example E1 in every respect except that the rates of thickening differed. Upon cooling, 100 parts of $SO_2$ extract were added.

EXAMPLE E9

One hundred parts of the polyglycol prepared in Example A2 and 20 parts of the diglycol ether of bisphenol A were placed in a three-necked flask equipped with a means of mechanical stirring and heating. The mixture was heated to 100°C. and held at that temperature for 1 hour; 100 parts of the oxyalkylated resin prepared in Example C6 and 100 parts of $SO_2$ extract were then added. The reaction was completed using the same procedure as in Example E1. The behavior of the reaction mixture was identical to that in Example E1 in every respect except that the rates of thickening differed. Upon cooling, 100 parts of $SO_2$ extract were added.

EXAMPLE E10

One hundred parts of the polyglycol prepared in Example A2 and 20 parts of the diglycidyl ether of bisphenol A were placed in a three-necked flask equipped with a means of mechanical stirring and heating. The mixture was heated to 100°C. and held at that temperature for 1 hour; 100 parts of the oxyalkylated resin prepared in Example C7 and 100 parts of $SO_2$ extract were then added. The reaction was completed using the same procedure as in Example E1. The behavior of the reaction mixture was identical to that in Example E1 in every respect except that the rates of thickening differed. Upon cooling, 100 parts of $SO_2$ extract were added.

EXAMPLE E11

One hundred parts of the polyglycol prepared in Example A2 and 20 parts of the diglycidyl ether of bisphenol A were placed in a three-necked flask equipped with a means of mechanical stirring and heating. The mixture was heated to 100°C. and held at the temperature for 1 hour; 100 parts of the oxyalkylated resin prepared in Example C8 and 100 parts of SO$_2$ extract were then added. The reaction was completed using the same procedure as in Example E1. The behavior of the reaction mixture was identical to that in Example E1 in every respect except that the rates of thickening differed. Upon cooling, 100 parts of SO$_2$ extract were added.

EXAMPLE E12

One hundred parts of the polyglycol prepared in Example A2 and 20 parts of the diglycidyl ether of bisphenol A were placed in a three-necked flask equipped with a means of mechanical stirring and heating. The mixture was heated to 100°C. and held at that temperature for 1 hour; 100 parts of the oxyalkylated resin prepared in Example C9 and 100 parts of SO$_2$ extract were then added. The reaction was completed using the same procedure as in Example E1. The behavior of the reaction mixture was identical to that in Example E1 in every respect except that the rates of thickening differed. Upon cooling, 100 parts of SO$_2$ extract were added.

EXAMPLE E13

One hundred parts of the polyglycol prepared in Example A2 and 20 parts of the diglycidyl ether of bisphenol A were placed in a three-necked flask equipped with a means of mechanical stirring and heating. The mixture was heated to 100°C. and held at that temperature for 1 hour; 100 parts of the oxyalkylated resin prepared in Example C10 and 100 parts of SO$_2$ extract were then added. The reaction was completed using the same procedure as in Example E1. The behavior of the reaction mixture was identical to that in Example E1 in every respect except that the rates of thickening differed. Upon cooling, 100 parts of SO$_2$ extract were added.

EXAMPLE E14

One hundred parts of the polyglycol prepared in Example A2 and 20 of the diglycidyl ether of bisphenol A were placed in a three-necked flask equipped with a means of mechanical stirring and heating. The mixture was heated to 100°C. and held at that temperature for 1 hour; 100 parts of the oxyalkylated resin prepared in Example C11 and 100 parts of SO$_2$ extract were then added. The reaction was completed using the same procedure as in Example E1. The behavior of the reaction mixture was identical to that in Example E1 in every respect except that the rates of thickening differed. Upon cooling, 100 parts of SO$_2$ extract were added.

EXAMPLE E15

One hundred parts of the polyglycol prepared in Example A2 and 20 parts of the diglycidyl ether of bisphenol A were placed in a three-necked flask equipped with a means of mechanical stirring and heating. The mixture was heated to 100°C. and held at that temperature for 1 hour; 100 parts of the oxyalkylated resin prepared in Example C12 and 100 parts of SO$_2$ extract were then added. The reaction was completed using the same procedure as in Example E1. The behavior of the reaction mixture was identical to that in Example E1 in every respect except that the rates of thickening differed. Upon cooling, 100 parts of SO$_2$ extract were added.

EXAMPLE E16

One hundred parts of the polyglycol prepared in Example A2 and 20 parts of the diglycidyl ether of bisphenol A were placed in a three-necked flask equipped with a means means of mechanical stirring and heating. The mixture was heated to 100°C. and held at that temperature for 1 hour; 100 parts of the oxyalkylated resin prepared in Example C13 and 100 parts of SO$_2$ extract were then added. The reaction was completed using the same procedure as in Example E1. The behavior of the reaction mixture was identical to that in Example E1 in every respect except that the rates of thickening differed. Upon cooling, 100 parts of SO$_2$ extract were added.

EXAMPLE E17

One hundred parts of the polyglycol prepared in Example A2 and 20 parts of the diglycidyl ether of bisphenol A were placed in a three-necked flask equipped with a means of mechanical stirring and heating. The mixture was heated to 100°C. and held at that temperature for 1 hour; 100 parts of the phenol formaldehyde resin prepared in Example B1 and 100 parts of the SO$_2$ extract were then added. The reaction was completed using the same procedure as in Example E1. The behavior of the reaction mixture was identical to that in Example E1 in every respect except that the rates of thickening differed. Upon cooling, 100 parts of SO$_2$ extract were added.

EXAMPLE E18

One hundred parts of the polyglycol prepared in Example A2 and 20 parts of the diglycidyl ether of bisphenol A were placed in a three-necked flask equipped with a means of mechanical stirring and heating. The mixture was heated to 100°C. and held at that temperature for 1 hour; 50 parts of the oxyalkylated resin prepared in Example C10, 50 parts of the phenol formaldehyde resin prepared in Example B1 and 100 parts of SO$_2$ extract were then added. The reaction was completed using the same procedure as in Example E1. The behavior of the reaction mixture was identical to that in Example E1 in every respect except that the rates of thickening differed. Upon cooling, 100 parts of SO$_2$ extract were added.

EXAMPLE E19

One hundred parts of the polyglycol prepared in Example A2 and 20 parts of the diglycidyl ether of bisphenol A were placed in a three-necked flask equipped with a means of mechanical stirring and heating. The mixture was heated to 100°C. and held at that temperature for 1 hour; 100 parts of the phenol formaldehyde resin prepared in Example B2 and 100 parts of SO$_2$ extract were then added. The reaction was completed using the same procedure as in Example E1. The behavior of the reaction mixture was identical to that in Example E1 in every respect except that the rates of thickening differed. Upon cooling 100 parts of SO$_2$ extract were added.

EXAMPLE E20

One hundred parts of the polyglycol prepared in Example A2 and 20 parts of the diglycidyl ether of bisphenol A and 50 parts benzene were placed in a three-necked flask equipped with a means of mechanical stirring and heating. The mixture was heated to 100°C. and held at that temperature for 1 hour; 100 parts of the oxyalkylated resin prepared in Example C1 and 100 parts of SO$_2$ extract were then added. The reaction was completed using the same procedure as in Example E1. The behavior of the reaction mixture was identical to that in Example E1 in every respect except that the rates of thickening differed. Upon cooling, the benzene which had been removed together with 50 parts of SO$_2$ extract was added.

EXAMPLE E21

One hundred parts of the polyglycol prepared in Example A2 and 20 parts of the diglycidyl ether of bisphenol A and 50 parts toluene were placed in a three-necked flask equipped with a means of mechanical stirring and heating. The mixture was heated to 100°C. and held at that temperature for 1 hour; 100 parts of the oxyalkylated resin prepared in Example C1 and 100 parts of SO$_2$ extract were then added. The reaction was completed using the same procedure as in Example E1. The behavior of the reaction mixture was identical to that in Example E1 in every respect except that the rates of thickening differed. Upon cooling, the toluene which had been removed together with 50 parts of SO$_2$ extract was added.

EXAMPLE E22

One hundred parts of the polyglycol prepared in Example A2 and 20 parts of the diglycidyl ether of bisphenol A and 50 parts xylene were placed in a three-necked flask equipped with a means of mechanical stirring and heating. The mixture was heated to 100° C. and held at that temperature for 1 hour; 100 parts of the oxyalkylated resin prepared in Example C1 and 100 parts of $SO_2$ extract were then added. The reaction was completed using the same procedure as in Example E1. The behavior of the reaction mixture was identical to that in Example E1 in every respect except that the rates of thickening differed. Upon cooling, the xylene together with 50 parts of $SO_2$ extract was added.

EXAMPLE E23

One hundred parts of the polyglycol prepared in Example A2 and 20 parts of the diglycidyl ether of bisphenol A and 50 parts methyl ethyl ketone were placed in a three-necked flask equipped with means of mechanical stirring and heating. The mixture was heated to 100°C. and held at that temperature for 1 hour; 100 parts of the oxyalkylated resin prepared in Example C1 and 100 parts of $SO_2$ extract were then added. The reaction was completed using the same procedure as in Example E1. The behavior of the reaction mixture was identical to that in Example E1 in every respect except that the rates of thickening differed. Upon cooling, the methyl ethyl ketone together with 50 parts of $SO_2$ extract was added.

While we prefer that the phenol-formaldehyde condensate be oxyethylated and/or oxypropylated, the invention can be practiced substituting in the foregoing disclosure the aforedisclosed non-oxyalkylated phenol-formaldehyde condensates for the aforedisclosed oxyalkylated phenol-formaldehyde condensates as reactants with the diglycidyl ether groups of the aforementioned bis-phenols, the reaction of the glycidyl ether groups presumably then occurring at the phenolic —OH groups instead of at a hydroxyl group of the adducted alkylene oxide.

Furthermore, while polyoxyalkylene glycols as aforedescribed are preferred as the other reactant with the diglycidyl ethers of the bis-phenols, the invention can be practiced with all oxypropylated and/or oxybutylated, terminally oxyethylated adducts as aforedescribed, e.g., by adding an alkylene oxide, such as, for example, 1,2-butylene oxide, or 1,2-propylene oxide, or mixtures thereof, to a suitable monohydric, dihydric or trihydric compound, such as, for example, normal butyl alcohol, secondary butyl alcohol, normal propanol, isopropanol, butanol-1, the butyl ether of diethylene glycol, phenol, ortho-, meta-, or para-isopropyl phenol, ortho-, meta-, or para-butyl phenol, ortho, meta-, or para-amyl phenol, propylene glycol, 1,2-propylene glycol, 1,3-butylene glycol, 1,2,6-hexa-methylenetriol, or glycerine. Thereafter ethylene oxide is added to the first adduct to form a second adduct which is an oxyethylated adduct in which the proportion of primary hydroxyl groups to secondary hydroxyl groups is such as to give the desired product when reacted with an epoxide of a polyphenol.

DEMULSIFICATION

The compositions of this invention are surface active and are particularly suitable for the demulsification of crude oil emulsions. Demulsification is achieved by mixing the demulsifying agents of this invention, at a ratio in the approximate range of one part of the demulsifying agent to 2,000–50,000 parts of the emulsion, and thereafter allowing the emulsion to remain in a relatively quiescent state during which separation of the oil and water occurs. The demulsifying agents of this invention may be used in conjunction with other demulsifying agents from classes such as the petroleum sulfonate type, of which naphthalene sulfonic acid is an example, the modified fatty acid type, the amine modified oxyalkylated phenol-formaldehyde type, and others.

The effectiveness of the compositions of this invention as demulsifying agents is illustrated in the following tests and data.

BOTTLE TESTING OF CRUDE OIL EMULSIONS

The bottle testing of crude oil emulsions is conducted according to the following procedure: Fresh samples of the emulsion-breaking chemicals in organic solvent solution are prepared in 10% solutions. These solutions are made by accurately diluting 10 milliliters of the emulsion breaking chemicals in 90 milliliters of a mixture of equal parts of anhydrous isopropyl alcohol and an aromatic hydrocarbon such as xylene. The mixture is agitated well until the emulsion breaking chemical is completely dissolved.

The equipment for running the crude oil emulsion breaking test, in addition to the foregoing 10 percent solutions, includes a set of 6 ounce graduated prescription bottles, a funnel, a graduated 0.2 milliliter pipette, a thief pipette, a centrifuge, centrifuge tubes and a thermometer. The graduated prescription bottles are filled to the 100 milliliter mark with the crude oil emulsion to be tested, preferably a sample which has been recently collected. If there is any free water in the crude oil emulsion sample collected, it is bled off before the bottles are filled. Each bottle is inverted several times with the bottle capped so that the bottle will be coated with an emulsion film.

By means of the 0.2 milliliter pipette, the prescribed volume of the 10 percent solution of the emulsion breaking chemical is added to the emulsion in the bottles. The bottles are then capped and given manual agitation for a predetermined number of counts. The number of counts are determined by a survey of the agitation which can be secured in the system in which the crude oil emulsion is being used. If the emulsion requires heat for treatment, the bottles are placed in hot water bath, the length of time and temperature determined by the particular plant equipment and practice in which the particular emulsion is employed. If the plant provides for hot agitation of the emulsion the bottles may be given a corresponding amount of manual hot agitation.

The bottles are then removed from the hot water bath and the water drop, presence of the bottom settlings (B.S.) layer and color and general appearance of the oil are noted.

A thief grind-out is taken on all bottles which appear to be promising. A thief grind-out is made by preparing centrifuge tubes filled with gasoline to the 50 percent mark. The thief pipette is set to the proper length by adjusting the rubber stopper so that the bottom of the pipette is about one-fourth inch above the oil-water level of the bottle with maximum water drop. This same setting is used for all subsequent thiefings on remaining bottles. The thiefed oil from each bottle is added to the centrifuge tube to the 100 percent mark, and the tube is shaken. The samples are then centrifuged for three minutes.

With certain paraffin base oils a portion of the paraffin is thrown down with the B.S. If the centrifuge tubes are heated to 150°F., the paraffin will melt and be dissolved in the gasoline-oil mixture and usually will not be thrown down again with the B.S. upon centrifuging while hot. However, occasionally the paraffin will re-congeal as the tube cools during centrifuging. If this occurs, the tube is removed from the centrifuge and heated to 150°F. without shaking or disturbing the settled B.S. layer. The heated sample is then centrifuged for 15 seconds. This should give a true B.S. reading free of paraffin.

An excess chemical grind-out is then run on each centrifuge by adding several drops of a 20 percent solution in white gasoline or other solvent of a chemical which causes complete separation of the water and oil. With some sensitive emulsions the chemical will cause re-emulsification. In these instances it is necessary to re-thief and add a lesser amount. Each tube is vigorously shaken to make sure that the B.S. layer is broken up and the tubes heated to 150°F. in the case of troublesome paraffin base crude oil. The samples are then centrifuged for three minutes.

During the test the speed of the water drop is observed carefully after the emulsion breaking chemical is added to the prescription bottles. The observation of the color and brilliance of the oil in transmitted light is very important. In general, the brilliance and depth of color increases with a decrease in B.S. & W. (bottom settlings and water) content. The observations of color are made in the oil in the prescription bottles before and after heat treatment. In the ideal treatment of crude oil emulsions the oil-water line should be a sharp, clean line without any web or sludge present. Presence of a considerable amount of sludge or web is undesirable because this foreign material will eventually go to stock in the treating plant and be reported as B.S. Traces of web or sludge, however, will disappear or be removed in the normal treating plant.

In almost all instances the thief grind-out and excess chemical grind-out readings indicate the formula that has most nearly produced crude oil free from B.S. and water. The most efficient emulsion breaking chemical is determined by the foregoing test procedure by the overall consideration of the following factors: relative speed of the breaking of the emulsion which is usually indicated by speed of water drop, color and brilliance of the oil layer, the relative absence of web or sludge at oil-water line and the ability to most nearly produce treated oil that is free from B.S. and water.

A comparison of the demulsification activity obtained with a demulsifier of the invention herein and a closely related composition which is a blend of the terminally oxyethylated butylene glycol-bisphenol A reaction product of Example A1 with the oxyethylated phenol-formaldehyde condensate of Example C1 is hereafter described.

The blend was prepared by charging a reactor with 4,050 parts of the solution product of Example A1, 650 parts of the diglycidyl ether of the bisphenol (Shell Epon 828, a trademark) and 2,000 parts of toluene. They are held at 100°–110 °C. for 1 hour. The temperature is raised slowly to 165°C. About 800–1,200 parts of toluene is distilled off. A gentle reflux is maintained at 165°–180°C. for 1½ hours, adding 3,060 pounds of aromatic hydrocarbon solvent when the viscosity of the vessel contents becomes high. The temperature is raised quickly to 210°–220°C. and held there for 30 minutes. A total of about 2,000–2,400 parts of aromatic solvent is distilled off.

The resultant product is cooled to 175°C. and is diluted with 4,210 parts of aromatic hydrocarbon solvent and 4,050 parts of the oxyethylated phenol-formaldehyde condensate solution of Example C1. The product is further diluted with 8,185 parts of the aromatic hydrocarbon solvent and is filtered at 70°–90 °C. The filtered product is further blended with 6,360 parts of aromatic hydrocarbon solvent to provide the product hereinafter identified as "Blend."

The Reaction Product was prepared in an analogous manner to the procedure of Example D1 and is hereinafter identified as "Reaction Product."

Comparative bottle test evaluations were made with the Blend and the Reaction Product on samples of a 22° gravity crude oil obtained from Garland Field, Wyoming. The crude oil emulsion contained about 25.5 percent water. At ratios of 0.12 part and 0.18 part by volume per 100 parts of the crude oil emulsion, of a 10 percent dilution of the foregoing solutions of the Blend and the Reaction Product after a 3 minute cold agitation of each test bottle, the bottle test results at a 150°F. test temperature were as follows:

cleaner separation of the oil and water phases of the emulsion.

It is generally preferred to demulsify at elevated temperature, e.g., about 80°–180°F. for best results. However, the demulsifiers of the invention can be employed at lower demulsification temperatures, if necessary, e.g., as low as about 40°F.

In the foregoing description of the invention herein, the diglycidyl ether of bis-phenol A is 4,4'-diglycidyloxy-diphenyl dimethyl methane and has the general formula

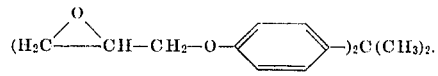

Preferred forms of the terminally oxyethylated polyoxypropylene glycols and the terminally oxypropylated polyoxybutylene glycols are those wherein said polyoxypropylene glycol has an average of about one of said terminal 2-hydroxyethyl group per mol of said glycol and wherein said polyoxybutylene glycol has an average of about two of said terminal 2-hydroxyethyl groups per mol of said glycol.

In the foregoing description, the preferred diglycidyl ethers are diphenyldiglycidyl ether or a diglycidyl ether of diphenylmethane wherein the remaining substituents on the methane carbon are hydrogen or methyl.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A substantially water-insoluble, at least partially oil soluble product formed by the reaction of (a) the diglycidal groups of an ether having the formula $[RO_x-(C_nH_{2n+1}O)y(CH_2CH_2O)_z]u(R_1)w$ wherein $x$ is 1 to 3; $n$ is 3 to 4; $y$ is 17 to 68 when $n$ is 3 and 7 to 56 when $n$ is 4; $z$ is 0.7 to 1.1 when $n$ is 4 and $x$ is 1 to 2; $z$ is 0.4 to 0.8 when $n$ is 3 and $x$ is 1 to 2; $z$ is 0.2 to 0.5 when $n$ is 3 to 4 and $x$ is 3; $u$ is 3 to 5; and $w$ is 2 to 4, R is a hydrocarbon radical containing up to 12 carbon atoms and $R_1$ is the residue of a diglycidyl ether of a polyphenol selected from the group consisting of dihydroxydiphenyldimethylmethane, dihydroxydiphenylmonomethylmethane and dihydroxydiphenyl, said residue being formed upon reacting a polyether alcohol corresponding to the polyether enclosed by bracket subtended by $u$ in the formula with 60–90 percent of the diglycidal ether groups of said diglycidyl ether of a polyphenol; with (b) the hydroxyl groups of a polyoxyalkylated alkyl phenol-formaldehyde polycondensate in a hydrocarbon solvent a temperature ranging from 140° to 210°C. until substantially all of the remaining, unreacted diglycidyl ether groups of said ether have reacted with the hydroxyl groups of said oxyalkylated polycondensate, the alkyl groups of the alkyl phenol having an average of four to 15 carbons, said polycondensate having an average of about four to 15 phenolic nuclei per molecule, the oxyalkylene groups of said polycondensate being selected from the group consisting of oxyethylene, oxypropylene, and both oxyethylene and oxypropylene, and the weight ratio of said last-mentioned oxyalkylene groups to said alkyl phenol-formaldehyde polycondensate being in the range of about 1:5 to 15:1, respectively.

2. The product of claim 1 in which $n$ is 3.

| Demulsifier | Ratio | Water drop, ml. | | | Thief grind out | | Excess grind out | |
|---|---|---|---|---|---|---|---|---|
| | | 25 min. | 50 min. | 120 min. | B.S. | Water | B.S. | Water |
| Blend | 0.12 | 5 | 10 | 20 | 3.4 | 0.4 | | 3.4 |
| Reaction product | 0.12 | 16 | 20 | 21 | 0.6 | 0.4 | | 1.2 |
| Blend | 0.18 | 6 | 16 | 20 | 2.2 | 0.8 | | 3.2 |
| Reaction product | 0.18 | 16 | 22 | 25 | 0.7 | | | 0.7 |

From the foregoing results, it will be appreciated that the Reaction Product was a considerably better demulsifier than was the Blend, both as to emulsion breaking power and as to water coalescing power, the latter being indicated by the 3. The product of claim 2 in which $z$ is 1.
4. The product of claim 1 in which $n$ is 4.
5. The product of claim 4 in which $z$ is 2.

* * * * *